United States Patent Office 3,538,770
Patented Nov. 10, 1970

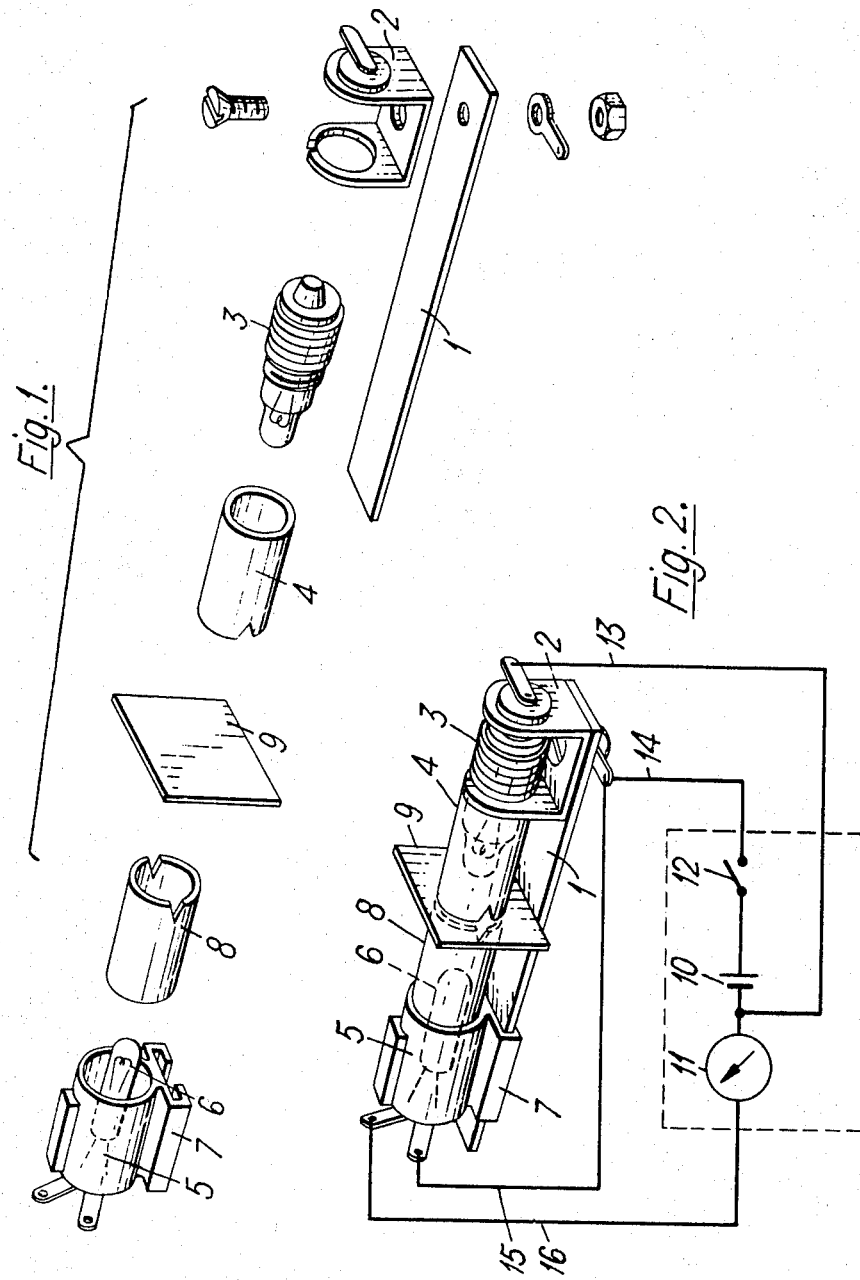

3,538,770
HUMIDITY METERS
Edwin Lawrence Hawley, Sittingbourne, Kent, England, assignor to E.P.S. (Research & Development) Limited, Kent, England, a British company
Filed Mar. 14, 1969, Ser. No. 807,214
Int. Cl. G01n 21/10
U.S. Cl. 73—336.5
4 Claims

ABSTRACT OF THE DISCLOSURE

A humidity meter comprising a light transmitting source and a humidity sensitive indicator element. The indicator element has at least one characteristic which changes with a change in humidity and is adapted to be positioned in said meter so that light emitted from said source is cast thereon. A light sensitive element is provided to sense light passing from said source via said indicator element and is connected to measuring means adapted to be controlled by said light sensitive element indicating a change in said characteristic of the indicator element.

---

This invention concerns humidity meters, such meters having particular application in the packaging industry where corrodible components are being packaged. In the packaging industry, it is generally accepted that if the relative humidity inside a sealed package is below 50% then any corrodible components within the package will not suffer from corrosion. It will nevertheless be appreciated that it is vital to know when the relative humidity exceeds such 50%.

Many different relative humidity indicating and measuring systems are known, such systems ranging from the very cheap coloured paper indicator (which changes from blue to lilac when the relative humidity exceeds approximately 50%) to the very expensive gold spluttered capacitive sensing element (which changes capacitance with variations of moisture content of the air and can thus be calibrated to record relative humidity on a capacitance meter).

The coloured indicator paper (and a variation of it in the form of coloured silica gel) has worked well for many years. The main disadvantage of such system is the absence of a direct calibration in terms of percentage relative humidity and furthermore the human difficulty of deciding just when the indicator changes colour.

The disadvantage of the capacitance sensing element is, of course, the cost of the same.

One object of the invention is to provide a relatively cheap, simple and reliable humidity meter which obviates, or at least reduces the aforementioned disadvantages.

Thus according to one aspect of this invention, there is provided a humidity meter comprising a light transmitting source and a humidity sensitive indicator element having at least one characteristic which changes with a change in humidity such element being adapted to be positioned in said meter so that light emitted from said source is cast thereon, and a light sensitive element being provided which is positioned to sense light passing from said source via said indicator element, said light sensitive element being adapted to control means which indicates a change in said characteristic of the indicator element, said indicating means being chosen to indicate relative humidity indicated by said indicator element.

Said light sensitive element may sense light passing through such indicator element or alternatively may sense light reflected thereby.

Desirably said light transmitting source may comprise an electric bulb (preferably a small lensed bulb), such bulb advantageously being shielded about its sides.

According to one feature of the invention, said indicator element may comprise a sheet of cobalt chloride impregnated material (such as paper), although it should be appreciated that any other indicator elements could be used which have a capability to vary their light reflectivity and/or transmissibility in response to variations in humidity.

According to another feature of this invention, said light sensitive element may comprise a photoelectric cell of the kind which varies its resistance in response to the intensity of light falling upon the same. Such cells have, for example, to be of the kind incorporating a valve coated with a photoremissive material or such cell may merely comprise a phosphor resistance. It will be noted however, that a phototransistor (or similar device) which changes conductance in response to intensity of light could possibly be utilized.

According to another aspect of the invention, a meter in accordance with this invention may comprise an electric bulb constituting a light source; a photoelectric cell constituting a light sensitive element, said bulb and said cell being positioned opposite one another and arranged to enable an indicator element to be positioned therebetween; said bulb being adapted to be connected through a switch to a supply of electricity and said photoelectric cell being electrically connected with said bulb; a meter (for example an ohmmeter) being wired in series with said photoelectric cell.

In order that the invention may be more readily understood, one embodiment of humidity meter will now be described by way of example and with reference to the accompanying drawings in which:

FIG. 1 is an exploded perspective view of a meter in accordance with this invention; and FIG. 2 is a perspective view of the meter of FIG. 1 but showing the meter assembled, typical electrical circuitry being shown diagrammatically to indicate how the meter operates.

This meter is particularly suitable for use with packages of corrodible components.

In this embodiment, the humidity meter comprises a mounting plate 1 having a U-shaped bulb support 2 secured at one end thereof, said support 2 carrying a small bulb 3 (of the lensed type) and the light emitting portion of the bulb 3 being surrounded by an open-ended cylindrical hood 4.

At the opposite end of the mounting plate 1 is a casing 5 for a photoelectric cell light sensing element 6, such casing being provided with a shoe 7 which embraces the plate 1 and which permits the casing 5 (and the element 6 contained therein) to slide towards and away from the bulb 3. This casing also has extending therefrom, in the direction of the bulb, an open-ended cylindrical light shield, this shield being designated 8.

A cobalt chloride impregnated indicator paper 9 is shown positioned at right-angles to the mounting plate 1 between the bulb 3 and the element 6 of said cell and this indicator paper 9 is trapped and retained in position by the hoods 4,8. The sliding shoe 7 enables the hood 8 to be moved into a position where the paper 9 is trapped.

The above described part of the humidity meter is adapted to be positioned within a package to sense the relative humidity within such package. Such part is however, adapted to be electrically connected to a control box (outside the package) housing a source of D.C. electricity, an ohmmeter and a switch respectively being indicated diagrammatically in FIG. 2 and respectively being designated 10, 11 and 12.

The bulb is connected by a pair of leads 13, 14 to said source 10, in this instance a dry cell battery and the switch 12 is positioned in series in the lead 14.

Wired in parallel with said bulb circuit is a photoelectric cell circuit constituted by leads 15, 16. In this embodiment, the photoelectric cell is of the kind in which the light sensing element predominantly varies its resistance (as opposed to its conductance) in response to the intensity of light falling upon the same. This element, which is wired in parallel with the bulb circuit and the battery, is wired in series with the ohmmeter 11. It is to be noted that such light sensitive element is of the kind whose resistance decreases as the light intensity increases.

It will be appreciated that in dry conditions the cobalt chloride impregnated indicator paper 9 will remain blue (as opposed to pink in more humid conditions) and its light transmissibility will be at a minimum. Thus a small quantity of light only will pass through the indicator paper 9 and the resistance of the light sensing element of the photoelectric cell will remain high and the ohmmeter 11 will give a reading appropriate to such high resistance when the electrical circuit is closed. However, when the relative humidity rises, the paper 9 will begin to change colour to pink and the light transmissibility will be increased. The intensity of the light falling upon the photoelectric cell will thus increase and the resistance of the sensing element 6 of the cell will decrease and the ohmmeter 11 will indicate a different reading.

It will thus be appreciated that after appropriate calibration of the ohmmeter 11, the relative humidity in the region of the indicator paper may be read directly from such ohmmeter. Thus, when a relative humidity indication is required, it is merely necessary to light the bulb 3 (by closing the switch 12) and to take a reading from the ohmmeter 11.

Naturally, in practice, the leads 13, 14, 15 and 16 from the sensing element and the bulb would be terminated at a point on the exterior of the package into which the device is to be fitted and the remainder of the circuitry would be incorporated into a portable box which may be readily transferred from package to package thus enabling one ohmmeter and one battery to be used to check the relative humidity within a number of different packages. Such box would also include switching facilities to check battery voltage and bulb filament continuity.

Whilst the meter described above relies on variation in light transmissibility, a meter could be provided which relies on light reflectivity or possibly a combination of both transmissibility and reflectivity of light.

In a meter making use of light reflectivity, the bulb and the light sensitive element would be mounted on the same side of the indicator paper and would be shielded from one another insofar as direct light is concerned.

If desired the light source may be arranged to emit light of a selected wavelength or wavelength range and the light sensitive element (for example a photoelectric cell) can be equipped with a filter, or otherwise made responsive only to light of that wavelength or wavelength range. Alternatively, or additionally, the light source may be arranged to provide a modulated, i.e. chopped, light beam and the light sensitive element (for example said cell) may be arranged to respond only to correspondingly modulated light.

These expedients, as will be understood, would enable the light sensitive element response to discriminate between light emanating from the source of light and spurious background illumination.

Modulation of the light emanating from said source is also desirable in order that the photo cell should produce a pulsating or alternating output which may readily be amplified by simple circuitry.

I claim:

1. A humidity meter comprising a light source, a humidity sensitive colour changing indicator element, a photo cell, said humidity indicator being positioned between said light source and said photo cell so that light emitted from said source is passed to said photo cell via said humidity indicator, said photo cell providing an electric signal responsive to changes in colour thus transmitted, a first cylindrical shield enclosing said light source, a second cylindrical shield enclosing said photo cell, said first and second shields being axially mounted on a common base, at least one of said shields being axially movable with respect to the other and provided with fastening means to secure the same to said base, said shields constituting gripping means adapted to retain said humidity indicator securely therebetween when said shields are moved into a position adjacent one another, and measuring means connected to said photo cell responsive to said signal for indicating the resultant change in humidity.

2. The meter according to claim 1 wherein said light source comprises an electrical bulb, a source of electricity for the bulb, and switch means for selective connection of said bulb to said source of electricity.

3. The meter according to claim 2 wherein said humidity indicator comprises a planar sheet of material impregnated with cobalt chloride, said sheet being arranged transversely to the axis of said first and second shields.

4. The meter according to claim 3 wherein said measuring device is adapted to be calibrated to provide a reference measure whereby any changes in signal from said photo cell provides an indication of relative humidity.

References Cited

UNITED STATES PATENTS

| | | | |
|---|---|---|---|
| 2,109,235 | 2/1938 | Kott | 73—335 |
| 2,460,065 | 1/1949 | Davis | 73—335 |
| 2,526,938 | 10/1950 | Davis et al. | 73—335 |
| 3,044,288 | 7/1962 | Randall | 73—1 |
| 3,166,928 | 1/1965 | Jackson | 73—336.5 |
| 3,412,599 | 11/1968 | Hammons | 73—335 |

LOUIS R. PRINCE, Primary Examiner

D. E. CORR, Assistant Examiner